United States Patent Office 3,769,244
Patented Oct. 30, 1973

3,769,244
POLYURETHANE FOAM REACTION CATALYZED BY SALTS OF 1,8 - DIAZA-BICYCLO(5,4,0)UNDECENE-7
Sei Hashimoto, Kyoto, Keizo Nakatani, Kyoto Prefecture, Shoji Suzuki and Hiroshi Daigo, Kyoto, and Ichizo Fujino, Shiga Prefecture, Japan, assignors to San-Abbott Limited, Kyoto, Japan
No Drawing. Filed Oct. 9, 1967, Ser. No. 673,999
Int. Cl. C08g 22/36, 22/46
U.S. Cl. 260—2.5 AC      7 Claims

ABSTRACT OF THE DISCLOSURE

A process for making polyurethanes from isocyanates and organic polyols in the presence of a urethane catalyst, said catalyst containing between 2 and 100% by weight of a diaza-bicyclo-alkene or an acid addition salt thereof.

---

The present invention is directed to the use of diaza-bicyclo-alkenes as catalyst for the preparation of polyurethane products. The new nitrogen containing heterocyclic compounds used as the catalyst in the present invention are those following the structural formula

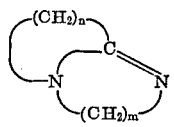

wherein $m$ is 2 or 3 and wherein $n$ is 3, 4 or 5 and their acid addition salts. They are useful as replacements or partial replacement of the previously used urethane catalyst in the preparation of rigid or flexible polyurethane foams and other polyurethane products. The present invention is also directed to the new compound of the above formula wherein $m$ is 3 and $n$ is 5.

The best polyurethane catalyst known today in the trade is triethylene diamine (also called diazabicyclo[2,2,2]octane and hereinafter sometimes referred to simply as TED) which is expensive and possesses a peculiar amine odor which carries into the final polyurethane product made therewith. The diaza-bicyclo-alkenes used in the present invention for the preparation of urethane products are almost odorless liquids. In addition to this advantage, they have the benefits of being more active than triethylene diamine or other organic amines in accelerating the isocyanate reaction and they are less expensive due to the ease of their preparation.

The new process for making polyurethanes is based on the isocyanate reaction between a compound having at least two active hydrogens as determined by Zerewitinoff and compounds having at least two groups represented by the general formula —N=C=Y wherein Y is oxygen or sulfur. The new process is carried out in the presence of at least one kind of a diaza-bicyclo-alkene (hereinafter sometimes referred to as DBA) of the above formula or its salts. Representatives of the compounds useful in the process of the present invention are 1,5-diaza-bicyclo(4,3,0)nonene-5;
1,8-diaza-bicyclo(5,4,0)undecene-7;
1,8-diaza-bicyclo(5,3,0)decene-7;
1,5-diaza-bicyclo(4,4,0)decene-5; or
1,4-diaza-bicyclo(3,3,0)octene-4.

Each of the diaza-bicyclo-alkenes of the above general formula may be synthesized by choosing one synthesis from the following four methods and by choosing the proper starting materials.

(A) Ethylene imine is added to the nitrogen atom of a lactam by conventional means to produce a N-(β-aminoethyl)lactam. The latter is cyclized by intramolecular dehydration. This produces compounds wherein $m$ is 2.

(B) Reaction between a lactam and acrylonitrile followed by hydrogenation and ring formation through intramolecular dehydration. This has been described by Oediger et al. in Berichte, vol. 99, page 2012 (1966), and produces compounds wherein $m$ is 3.

(C) A lactam is reacted with acrylonitrile as in B above, followed by saponification of the nitrile group, Hoffman rearrangement and ring formation by intramolecular dehydration. This method produces compounds wherein $m$ is 2.

(D) An N-(ω-aminoalkyl)-lactam is prepared by reacting a lactone with an excess amount of an alkylene diamine as suggested by Copenhaver et al. in "Acetylene and Carbon Monoxide Chemistry," page 164 (Reinhold Publishing Corporation, New York) and by subsequent ring formation by intramolecular dehydration. Depending upon the choice of the lactone and the number of carbon atoms between the lactam ring and the amino group, $m$ and $n$ are variable.

The new compounds of the present invention are colorless to yellowish liquids; some of them have a very slight, nonobjectionable but specific odor; they are soluble in aromatic solvents and alcohol, and soluble or dispersable in water. The amount of these compounds used as catalysts in the process of the present invention is generally between 0.01 and 5% by weight based on the compound having active hydrogens; a more narrow and preferred range is between 0.05 and 1%. Obviously, more than the above limit of the catalyst may be used but since there is no advantage gained by using excessive amounts, larger amounts are uneconomical.

As mentioned, acid addition salts of the above diaza-bicyclo-alkenes are equally useful in the process of the present invention. The term "acid addition salts" is intended to include the salts formed with acids as well as the salts formed with other proton-donating compounds. Representative acids for making these salts are mono-carboxylic acids, such as formic acid, acetic acid, propionic acid, butyric acid, caproic acid, valeric acid, octylic acid, lauric acid, stearic acid, oleic acid; dicarboxylic acids, such as oxalic acid, malonic acid, succinic acid, fumaric acid, adipic acid; hydroxy acids, such as glycolic acid, lactic acid, tartaric acid and the like; sulfonic acids, such as alkyl- or aryl-sulfonic acids, sulfamic acid, sulfanilic acid; inorganic acids, such as carbonic acid, phosphoric acid, hydrochloric acid, sulfuric acid and the like and other proton-donating compounds such as sulfonamides; phenols, such as phenol, cresol, and the like; enols, such as barbituric acid, uric acid and the like. Particularly preferred acids are fatty acids having at least two carbon atoms and phenols.

In order to prepare the salt forms, one simply reacts the free base with a stoichiometric amount of the selected proton-donating compound. The salt formation occurs readily at room temperature without the aid of a catalyst. If solid reactants are employed, it may be advanatgeous to use an inert volatile solvent such as benzene, toluene, xylene, hexane, heptane, methylene chloride, chloroform, or the like as the reaction medium. The solvent can then readily be removed at the conclusion of the reaction by conventional methods. The salt product does not require any further purification, although recrystallization from a solvent such as isooctane may be resorted to if a product of high purity is demanded.

The compounds having active hydrogen atoms employed in the present invention are those which have been used in the previously known processes of polyurethane production. In the simplest embodiment, these compounds are dihydroxyalkenes but higher molecular weight compounds such as the following polymers are often used. Average molecular weights of these polymers may be between 150 and 10,000. Typical representatives of such polymers are polyesterpolyols, for example, the reaction products between (1) oxalic acid, succinic acid, maleic acid, adipic acid, sebacic acid, phthalic acid, ricinoleic acid and the like and (2) ethylene glycol, propylene glycol, butylene glycol, 2-ethylhexane-1,3-diol, glycerine, trimethylol propane, 1,2,6-hexanetriol, pentaerythritol, sorbitol, sugar and the like; polymerized lactones; polyetherpolyols, for example, alkylene oxides such as ethylene oxide, propylene oxide and butylene oxide modified polyols such as propylene glycol, glycerine, trimethylol propane, 1,2,6-hexanetriol, sorbitol and the like; polyesterpolyetherpolyols, for example, alkylene oxide modified polyols of the above polyesterpolyols; polyesterpolyamides, for example, condensates of the above acids with aminoglycols, diamines, ethanolamines and the like. These compounds may be employed by themselves or in admixture with one another and they may be replaced to the extent of between 0.01 and 10% by weight of water where foamed end products are desired. An amount of about 5% by weight of water based on the amount of the polyol used is usually sufficient to generate the required volume of gas to result in a foamed product.

Other compounds having active hydrogen atoms employed in the present invention are polyhydric alcohols, for example, ethylene glycol, propylene glycol, 1,4-butanediol, hexamethylenediols, cyclohexanediols, 2,4-dimethyl-2-(2-hydroxyethoxymethyl)-1,5-pentanediol, 1,2,6-hexanetriol, pentaerythritol, sorbitol, 2,4,6-tris(hydroxymethyl)-aryloxybenzene; polyamines, for example, 4,4'-methylene bis(2-chloro-aniline), 4,4'-bis(2-chloroaniline); polyaminepolyols, for example, alkylene oxide modified ethylenediamine, and the like. These are usually employed for making polyurethane elastomers as chain extending or cross-linking agents in conjunction with the above higher molecular weight polyols.

The compounds having the group —N=C=Y (polyisocyanates or polythioisocyanates) employed in the present invention, are the same compounds that have been used in the previously known processes; for example, butylene-1,4 - diisocyanate, 2 - methylbutylene - 1,4-diisocyanate, phenylene diisocyanates, tolylene diisocyanates, diphenylmethane diisocyanates, xylylene diisocyanates, naphthylene diisocyanates, 2,4-tolylene diisocyanate dimer, triphenylmethane-4,4',4''-triisocyanate, benzene triisocyanate, the reaction products of hexanetriol (or trimethylol propane) with a tolylene diisocyanate, prepolymers made from the above polyols and the above polyisocyanates, and xylylene-α,α'-diisothiocyanate. These compounds and their corresponding thio-analogs may be used by themselves or in admixture with one another to form polyurethanes by reacting with the compounds having active hydrogens which are exemplified in the preceding paragraphs.

In the process of the present invention, the diaza-bicyclo-alkenes are used in the same fashion as previous polyurethane catalysts have been used, for example, a catalyst may be used in its liquid form per se or by dissolving or dispersing it in a polyol or a proper solvent; it can be used under any temperature or other conditions whether alone or in the presence of other catalysts known to be useful in the preparation of polyurethanes, for example, tin compounds such as stannous chloride, dibutyltin-di-2-ethylhexoate, stannous octoate, dibutyltin dilaurate, stannous oleate and the like or other organo-metallic compounds; tertiary amines, e.g. trialkyl amines like triethylamine, tributylamine, N,N-dimethylbenzylamine, N,N-dimethylcyclohexylamine, and the like; alkanolamines e.g. N,N-dimethylethanolamine, N-methyldiethanolamine, triethanolamine and the like; cyclic amines, e.g. triethylenediamine, 4-dimethylaminopyridine, N-methylmorpholine, N-methylpiperidine, N-methylpyrrolidine, N,N'-dimethylpiperazine and the like; polyamines, e.g. tetraethylethylenediamine, pentamethyldiethylenetriamine, and the like; or secondary amines such as 2-methylimidazole and the like; alkali metallic compounds, radical producers and other co-catalysts. Where tin compounds are used in conjunction with diaza-bicyclo-alkenes, they may comprise 10–98% of the total weight of the catalyst employed; where other amines are used, they should not comprise more than 80% of the total catalyst weight. Of course, tin compounds and other amines can be combined with the above diaza-bicyclo-alkenes. A preferred mixture of all three types of catalysts comprises 2–90% by weight of diaza-bicyclo-alkenes and other amines and 98–10% by weight of a tin compound, with the "other amines" representing 5–80% by weight of the weight of the total amines.

The method employed in the present invention is suitable for the conventional processes of preparing polyurethane foams, polyurethane elastomers and polyurethane coatings as well as for the cross-linking reaction often desirable to follow the straight polymerization. Thus, a polyurethane foam can be produced in a one- or a two-shot process by mixing an active hydrogen compound, a polyisocyanate, water and/or another foaming agent, a foam regulator, a catalyst, etc. in a certain order. A polyurethane elastomer can also be produced in a one- or two-shot process by mixing an active hydrogen compound, a polyisocyanate, a cross-linking agent, a catalyst, etc. If a solvent is used in the process, a polyurethane suitable for coatings may be obtained. All other conditions are the same as in a conventional urethane polymerization process. In any of these cases, foaming agents, e.g. trichlorofluoromethane, foam stabilizers, emulsifiers, foam regulators, e.g. silicone surfactants, dyes, pigments and fillers may advantageously be added to the mixture of the above exemplified coreactants and catalysts.

The above-mentioned method of the present invention accelerates considerably the reaction of polyurethane formation and, therefore, the required amount of the catalyst is very small. Furthermore, the new catalysts are inexpensive and, therefore, very economical in their use. Because the new catalysts have only a slight and non-objectionable odor and since they are non-volatile liquids or solids, the resulting polyurethane products are free of undesirable odors.

In order to illustrate the process of the present invention, reference is made to the following examples which, however, are not meant to limit the invention in any respect. In all instances, parts and proportions are meant as parts by weight.

EXAMPLE 1

To 10 g. of a polyol made by the addition of 1,2-propylene oxide to glycerine and having an average molecular weight of 3,000 is added 0.1 g. of 1,8-diaza-bicyclo(5,4,0)undecene-7 at 25° C. and subsequently, 0.87 g. of a polyisocyanate consisting of 80% 2,4-tolylene diisocyanate and 20% 2,6-tolylene diisocyanate is added. The obtained mixture is inserted into a test tube and sealed. The test tube is then placed in a constant temperature bath of 70° C., exactly one minute after adding the diisocyanate. A gelation time of 1.5 minutes is determined which is the time after which the mixture no longer flows in the inverted test tube.

With the homologous 1,4-diaza-bicyclo(3,3,0)octene-4, the gelation time is determined as being 2 minutes; with 1,5-diaza-bicyclo(4,3,0)nonene-5, the gelation time also is 2 minutes.

When using TED in place of the catalysts used above, a gelation time of 4 minutes is observed; replacing the above catalyst with 2-methyl-imidazole or N,N-dimethylethanolamine, the observed gelation times are 13 and 96 minutes, respectively.

EXAMPLE 2

A polyoxyalkylene polyol is reacted with a prepolymer made from a polyetherpolyol (an adduct of 1,2-propylene oxide to 1,2-propylene glycol of an average molecular weight of 950) and the polyisocyanate made according to Example 1 but having an average molecular weight of 1380 and having 6.1% of free isocyanate groups. The urethanes from two different polyoxyalkylene polyols as coreactants and using 1,8-diaza-bicyclo(5,4,0)undecene-7 as the catalyst are compared with those using TED as the catalysts. In each instance, 0.1 g. of the catalyst is mixed with 10 g. of the polyoxylakylene polyol at 25° C. to which mixture is added an equivalent amount of the above described prepolymer. Agitation is started immediately after the addition of the prepolymer and the mixture is sealed in a test tube which is placed in a bath of 70° exactly 1 minute after adding the isocyanate. Gelation time is determined as in Example 1. The results are shown in Table 1.

TABLE 1

| Polyoxyalkylene polyol (adduct of propylene oxide to propylene glycol) | Amount of prepolymer, g. | 1,8-diaza-bicyclo-(5,4,0) undecene-7, min. | TED, min. |
| --- | --- | --- | --- |
| Average mol. wt., 950 | 14.5 | 5 | 15 |
| Average mol. wt., 2,000 | 6.9 | 5 | 15 |

EXAMPLE 3

The reaction rate and catalytic constants of 1,5-diazabicyclo(4,3,0)nonene-5 [called DBA-1,5(4,3,0)-5 in Table 2] and some of its homologs is determined using different polyols or water with the polyisocyanate of Example 1 as the coreactants. A solution of 5 ml. of the polyisocyanate (0.8 eq./liter) in 25 ml. of dioxane is placed in a polyethylene beaker which is immersed for 20 minutes in an 80° bath and a mixture of 10 ml. of a polyol solution (0.4 eq./liter) or water (0.4 mol/liter) and 10 ml. of a solution of 1,5-diaza-bicyclo(4,3,0)-nonene-5 (0.002 mol/liter) is added to it. The unreacted isocyanate is determined at appropriate intervals by placing 5 ml. of the mixture in a flask with 1 ml. of 0.3 N di-n-butylamine in 10 ml. of benzene, allowing the mixture to stand for 15 minutes and titrating it subsequently with 0.01 N methanolic hydrochloric acid to the end point indicated by bromophenol blue.

TABLE 2

| Hydroxy compound | Catalyst | Reaction rate, liter per eq.-hr. | Catalytic constant (liter)$^2$ per mol.-eq.-hr |
| --- | --- | --- | --- |
| Water | DBA-1,8(5,3,0)-7 | 12.7 | 3.17×10$^4$ |
| Do | DBA-1,5(4,3,0)-5 | 53.4 | 13.6×10$^4$ |
| Do | DBA-1,8(5,4,0)-7 | 123.9 | 30.58×10$^4$ |
| Do | DBA-1,8(5,4,0)-7 acetate | 89.9 | 22.0×10$^4$ |
| Do | DBA-1,8(5,4,0)-7 phenolate | 154.0 | 38.5×10$^4$ |
| Do | TED | 7.56 | 1.89×10$^4$ |
| Polyester polyol[1] | DBA-1,8(5,4,0)-7 | 616.5 | 154.2×10$^4$ |
| Do | DBA-1,8(5,3,0)-7 | 14.0 | 3.50×10$^4$ |
| Do | TED | 13.9 | 3.47×10$^4$ |
| Of Example 1 | DBA-1,8(5,4,0)-7 | 120.2 | 29.95×10$^4$ |
| Do | DBA-1,4(3,3,0)-4 | 2.52 | 0.63×10$^4$ |
| Do | DBA-1,5(4,3,0)-5 | 58.9 | 14.8×10$^4$ |
| Do | TED | 2.12 | 0.53×10$^4$ |
| Do | DBA-1,8(5,4,0)-7 acetate | 139.0 | 34.8×10$^4$ |
| Do | DBA-1,8(5,4,0)-7 phenolate | 157.0 | 39.3×10$^4$ |

[1] The polyester made from diethylene glycol and adipic acid: average molecular weight 1,538: acid value 0.32.

In all instances, the reaction rate constants in the above reactions using TED in place of the new catalysts are considerably and significantly lower and the catalytic constants, for the most part, are only fractions of those obtained with 1,5-diaza-bicyclo(4,3,0)nonene-5.

1,5-diaza-bicyclo(4,3,0)nonene-5 used above is prepared from N-(β-cyanoethyl)-pyrrolidone by the method of Oediger referred to above.

EXAMPLE 4

Using the polyisocyanate of Example 1 and the polyol of Example 1 with 1,8-diaza-bicyclo(5,4,0)undecene-7 or 1,5-diaza-bicyclo(4,3,0)nonene-5 as the catalysts, the amount of carbon dioxide evolution is determined at intervals and compared with the carbon dioxide evolution obtained using TED as the catalyst. In Table 3 below the entries determined the percentage of the theoretical amount of carbon dioxide.

TABLE 3

| | Minutes | | | | | |
| --- | --- | --- | --- | --- | --- | --- |
| | 5 | 10 | 20 | 30 | 60 | 180 |
| 1,5-diaza-bicyclo(4,3,0)nonene-5 | 41 | 73 | 87 | 90 | 91 | 93 |
| 1,8-diaza-bicyclo(5,4,0)undecene-7 | 47 | 90 | 93 | 93 | 93 | 93 |
| TED | 25 | 33 | 43 | 49 | 57 | 59 |
| 2-methyl-imidazole | 8 | 13 | 18 | 22 | 31 | 46 |

This table shows that the carbon dioxide evolution is accelerated considerably more with the new catalyst when compared with TED which is presently favored in the trade. Also, the results show that the new process produces an immense improvement in gas evolution over 2-methyl-imidazole which is considered the catalyst for $CO_2$-evolution in the trade.

EXAMPLE 5

A polymer is made using 250 g. of the polyol described in Example 1 and 137 g. of the polyisocyanate of Example 1 with 1,5-diaza-bicyclo(4,3,0)nonene-5 as the catalyst. In all instances the reaction mixture contains also 1.0 g. of stannous octoate, 5.0 g. of Silicone I-520 (a foam stabilizer, marketed by Union Carbide Corporation) and 11.25 g. of water and other additives as indicated in Table 4.

TABLE 4

| Test | (a) | (b) | (c) | (d) | (e) | (f) |
| --- | --- | --- | --- | --- | --- | --- |
| Catalyst, g | 0.125 | 0.125 | 0.125 | 0.25 | 0.25 | 0.5 |
| Additive, g | | [2] 0.5 | [1] 0.2 | | [2] 0.5 | |
| Rise time, sec | 103 | 104 | 86 | 81 | 81 | 100 |
| Foam heights, cm | 20 | 20.5 | 21 | 21.5 | 21.5 | 21.0 |
| Density in g./cc | 0.0238 | 0.0223 | 0.0235 | 0.0231 | 0.0230 | 0.0231 |
| Compression set, percent | 3.8 | 3.4 | 3.1 | 3.4 | 3.7 | 3.9 |
| Compression-load deflection at— | | | | | | |
| 25% | 12.1 | 12.0 | 12.9 | 12.0 | 11.0 | 13.0 |
| 65% | 24.0 | 22.2 | 23.0 | 21.2 | 20.5 | 23.7 |
| Tensile strength in kg./cm.$^2$ | 1.47 | 1.48 | 1.19 | 1.30 | 1.06 | 1.35 |
| Tear strength in kg./cm. | 0.98 | 0.96 | 0.94 | 0.80 | 0.88 | 1.07 |
| Ultimate elongation, percent | 258 | 248 | 199 | 228 | 201 | 237 |

[1] The adduct of 11 mols. of ethylene oxide and nonylphenol used as a surface-active agent.
[2] DMSO; dimethylsulfoxide.

EXAMPLE 6

A polyurethane foam is made by mixing 2.0 parts of a foam stabilizer (Silicone L-520), 4.5 parts of water, 0.1 parts of 1,8-diaza-bicyclo(5,4,0)undecene-7 and 0.4 part of stannous octoate with 100 parts of the polyol of Example 1. To this mixture is added 54.8 parts of the polyisocyanate of Example 1 and 5 seconds after this addition, the mixture is agitated with a high speed stirrer for 10 seconds and then poured into a foaming carton. Highest foaming is attained 81 seconds after starting the stirring, producing an excellent, snow-white, odorless, flexible polyurethane foam.

Almost identical results are obtained by using 0.025 and 0.05 parts of the above diaza-bicyclo-compound with 0.4 parts of stannous octoate and by using 1.0 part of the above diaza-bicyclo-compound without stannous octoate with an otherwise identical mixture; highest foaming is attained after 100, 95 and 150 seconds, respectively. When the above catalyst is replaced by 0.1 part of 1,8-diaza-bicyclo(5,3,0)decene-7, almost identical results are obtained. A similar result is also obtained by using 0.1 part of 1,5-diaza-bicyclo(4,3,0)nonene-5, or 1,4-diazabicyclo(3,3,0)octene-4 in the above mixture.

A rigid polyurethane foam is made by mixing 2.0 parts of a foam stabilizer (Silicone L-520), 0.5 parts of 1,8-diaza-bicyclo(5,4,0)-undecene-7 and 35 parts of trichloromonofluoromethane with 88 parts of a polyol made by the addition of 1,2-propylene oxide to sorbitol and having a hydroxyl number of 482 KOH mg./g. To this mixture is added 112 parts of crude diphenylmethane-4,4′-diisocyanate and 5 seconds after this addition, the mixture is agitated with a high speed stirrer for 20 seconds and then poured into a foaming carton. Highest foaming is attained 236 seconds after starting the stirring, producing a good, slightly brown, odorless, rigid polyurethane foam having a density of 31.6 kg./m.$^3$. When this catalyst is relaced by 0.8 parts of N-methylmorpholine and 0.2 parts of 1,8-diaza-bicyclo(5,4,0)undecene-7, highest foaming is attained within 310 seconds, producing a similar rigid foam having a density of 30.1 kg./m.$^3$.

EXAMPLE 7

In order to determine the activity of the salts of 1,8-diaza-bicyclo(5,4,0) - undecene - 7, flexible polyurethane foams are prepared from 49.7 parts of the polyisocyanate of Example 1, 100 parts of the polyol of Example 1, 1.5 parts of a foam stabilizer, 4.0 parts of water, 0.4 parts of stannous octoate, 5 parts of trichloromonofluoromethane and the following salts of 1,8 - diaza-bicyclo (5,4,0)undecene-7 (0.1 part as the free base). In each case the mixture is agitated for 10 seconds with a high speed stirrer at 25° C. and then poured into a carton. In each instance, a good flexible foam is obtained. The rise time (the time from the start of mixing to the time at which the highest foaming is attained) of the salt is shown in Table 5.

TABLE 5

| Kinds of acid used: | Rise time (sec.) |
|---|---|
| Formic | 88 |
| Acetic | 85 |
| Propionic | 84 |
| Enanthic (heptylic) | 82 |
| 2-ethyl hexoic | 83 |
| Oleic | 84 |
| Malonic | 100 |
| Adipic | 99 |
| Fumaric | 108 |
| Naphthenic | 87 |
| Lactic | 95 |
| Glycolic | 99 |
| Levulinic | 91 |
| Glutamic | 110 |
| Benzoic | 88 |
| Anisic | 86 |
| Nicotinic | 89 |
| Phenol | 83 |
| p-Cresol | 82 |
| p-Nitrophenol | 102 |
| p-Toluenesulfonic | 93 |
| Methane sulfonic | 104 |
| Barbital | 83 |
| Hydrochloric | 110 |
| Carbonic | 88 |
| Phosphoric | 125 |
| Non-acid (free base) | 86 |

EXAMPLE 8

In order to determine the activity of mixed catalysts, flexible polyurethane foams are prepared from 54.8 parts of the polyisocyanate of Example 1, 100 parts of the polyol of Example 1, 2 parts of a foam stabilizer, 4.5 parts of water, 0.4 parts of stannous octoate and 0.1 parts of a catalyst mixture containing 0.05 parts of 1,5-diaza-bicyclo(4,3,0)nonene-5 and (A) 0.05 parts of triethanolamine
(B) 0.05 parts of 2-methylimidazole
(C) 0.05 parts of N-methylmorpholine, or
(D) 0.05 parts of N,N-dimethylethanolamine.

In each case the mixture is agitated for 7 seconds with a high speed stirrer at 25° C. and then poured into a carton. In each instance, a flexible foam of excellent quality is obtained.

As will be seen from some of the above examples, 1,8-diaza-bicyclo(5,4,0)undecene-7 appears to be superior in its catalytic activity over its homologues, although the whole series of homologues is industrially usable in the process of the present invention to make colorless and in most instances, odorless polyurethane products, whether used alone or in conjunction with other catalysts known to be used in this reaction. Since 1,8-diaza-bicyclo(5,4,0) undecene-7 has particularly outstanding properties within the described series, a more detailed description of its preparation is given below.

To 113 g. (1 mole) of ε-caprolactam is added dropwise 58 g. (1.1 mole) of acrylonitrile containing 0.5 g. of hydroquinone under stirring at 80° C. over a period of 90 minutes. The mixture is subsequently stirred for another 2 hours after which time 1.4 ml. of concentrated hydrochloric acid is added and the mixture is distilled under reduced pressure to produce 111 g. of N-(β-cyanoethyl)-ε-caprolactam boiling at 130–139° C. and 0.2 mm. pressure, representing a yield of 67% in this step.

In a mixture of 50 ml. of methanol and 40 ml. of liquid ammonia is dissolved 111 g. (0.67 mole) of N-(β-cyanoethyl)-ε-caprolactam; this is reduced in the presence of 9 g. of Raney nickel at 100 to 120° C. under a hydrogen pressure of 95 to 110 kg./cm.$^2$. After absorption of almost the theoretical amount of hydrogen, the solvents are distilled off and the residue is distilled under reduced pressure to produce 93 g. of N-(γ-aminopropyl)-ε-caprolactam boiling at 115–122° C. and 0.9 mm. pressure, representing a yield of 82% in this step.

A mixture of 55 g. of N-(γ-aminopropyl)-ε-caprolactam, 77 ml. of xylene and 0.5 g. of p-toluene sulfonic acid is heated under reflux for several hours. The mixture is then fractionated, producing 45.7 g. of 1,8-diaza-bicyclo (5,4,0)undecene-7 boiling at 97–98° C. at 3 mm. pressure representing a yield of 95% in this step. The new compound has a refractive index of $n_D^{20}$ of 1.5209, a density $d_4^{20}$ of 1.0378, produces a pH of 12.9 as a 0.1 molar aqueous solution; its picrate melts at 123–125° C.

In similar fashion, 1,4-diaza-bicyclo(3,3,0)octene-4 is made by first condensing γ-butyrolactone with ethylene diamine in the presence of p-toluene sulfonic acid for 8 hours at 250° and 5 hours at 300° in an autoclave and reacting the formed N - (β-aminoethyl)pyrrolidone in xylene with p-toluene sulfonic acid under reflux for several hours. The pure 1,4-diaza-bicyclo(3,3,0)octene-4 distills at 112–125° C. under 40 mm. pressure. The 1,8-diaza-bicyclo(5,3,0)decene-7 is made by condensing ε-caprolactone with ethylene diamine in the presence of p-toluene sulfonic acid, separating the formed N-(β-aminoethyl)-ε-hydroxycapronic acid by distillation and reacting the latter under high speed stirring with p-toluene sulfonic acid in the absence of xylene at 270–280° for several hours. The pure compound boils at 110–119° C. under 15 mm. pressure. Of course, the other methods mentioned briefly above may be substituted for the more detailed description indicated in this section.

As will be seen from the above examples and disclosure, the new catalysts can be used in conjunction with previously known polyurethane catalysts. As mentioned above, the catalysts of the present invention are used generally in the range of between 0.01 and 5% by weight based on the weight of the compound with the active hydrogen. This range represents the total amount of catalyst and may be present as diaza-bicyclo-alkene alone, a mixture of diaza-bicyclo-alkenes, or a mixture of diaza-bicyclo-alkenes with other catalysts known to promote the reaction between a polyol and a polyisocyanate. Of the total amount of catalysts used in this process, it is preferred that at least 2% by weight is a diaza-bicyclo-alkene, the remaining 0–98% being represented by organo-metallic catalysts such as stannous octotate or organic amines such as triethanolamine, 2-methylimidazole, N-methylmorpholine, N,N-dialkylethanolamine and the like or mixtures thereof. When organo-metallic catalysts are used as the co-catalyst with the described diaza-bicyclo-alkenes, it is preferred that the latter be used in a range of between 2 and 90% (more preferably between 15 and 40%) of the total catalyst amount. Other teritary amines or secondary amines may replace the latter in a range of between 5 and 80% of the amount of the latter. When using a DBA in conjunction with secondary or tertiary amines as the sole type of co-catalysts, the weight ratio between said DBA and said secondary or teritary amines can vary in a wide range depending on the kind of product desired, e.g. a flexible, semi-rigid or a rigid product. The mixture of catalysts preferably contains no more than about 98% (preferably less than 80%) of such an amine or such amines together with at least 2% (preferably 20%) of a diaza-bicyclo-alkene or a mixture of two or more different diaza-bicyclo-alkenes. The reason for admixing the catalyst of the present process with other urethane catalysts may be for the purpose of producing a polyurethane of particular physical and dimensional properties; however, often the new bicyclic catalyst may also be mixed with an inexpensive amine catalyst because of economy since many of these amines are inexpensive; but used alone, they rarely give a satisfactory product at a reaction speed which is sufficiently high for large-scale production. Since the use of a combination of organic amines and organo-metallic catalysts is common in the polyurethane industry, those skilled in the art will readily be aware of desired and preferred catalyst mixtures between the diaza-bicyclo-alkenes described herein and the above types of co-catalysts.

We claim:

1. A process which comprises reacting an organic polyisocyanate or an organic polythioisocyanate with a compound having at least two active hydrogen atoms as determined by the Zerewitinoff method in the presence of a urethane catalyst comprising from 2 to 100% by weight of an acid addition salt of 1,8-diaza-bicyclo (5,4,0)undecene-7, said acid being selected from the group consisting of phenol, glutamic acid, p-cresol, p-nitrophenol, glycolic acid, and 2-ethylhexanoic acid.

2. The process of claim 1 wherein said acid addition salt is formed from phenol and 1,8-diaza-bicyclo(5,4,0) undecene-7.

3. The process of claim 1 wherein said acid addition salt is formed from p-cresol and 1,8-diaza-bicyclo (5,4,0) undecene-7.

4. The process of claim 1 wherein said acid addition salt is formed from glutamic acid and 1,8-diaza-bicyclo-(5,4,0)undecene-7.

5. The process of claim 1 wherein said acid addition salt is formed from p-nitrophenol and 1,8-diaza-bicyclo-(5,4,0)undecene-7.

6. The process of claim 1 wherein said acid addition salt is formed from glycolic acid and 1,8-diaza-bicyclo-(5,4,0)undecene-7.

7. The process of claim 1 wherein said acid addition salt is formed from 2-ethylhexanoic acid and 1,8-diaza-bicyclo(5,4,0)undecene-7.

References Cited

UNITED STATES PATENTS

| | | | |
|---|---|---|---|
| 2,932,621 | 4/1960 | Terry | 260—2.5 AC |
| 3,222,303 | 12/1965 | Hampson | 260—2.5 AC |
| 3,320,190 | 5/1967 | Allport et al. | 260—2.5 AC |
| 3,372,130 | 3/1968 | Chess et al. | 260—2.5 AC |
| 3,201,358 | 8/1965 | Hostettler et al. | 260—2.5 |
| 3,320,190 | 5/1967 | Allport et al. | 260—2.5 |
| 2,842,506 | 7/1958 | Roussel | 260—2.5 |

FOREIGN PATENTS

| | | | |
|---|---|---|---|
| 794,051 | 4/1958 | Great Britain | 260—2.5 AC |
| 839,185 | 6/1960 | Great Britain | 260—2.5 AC |

OTHER REFERENCES

Lange, Handbook of Chemistry & Physics, 39th ed., Chem. Rubber Publ. Co., Cleveland (1957–8), pp. 1644–5.

Rochester, Acidity Functions, Academic Press, London (1970), p. 57. Call No. QD281063.

DONALD E. CZAJA, Primary Examiner

H. S. COCKERAM, Assistant Examiner

U.S. Cl. X.R.

260—18 TN, 75 NC, 77.5 AC